United States Patent [19]

Danckert

[11] 4,440,257

[45] Apr. 3, 1984

[54] VIBRATION-INSULATING BEARING ARRANGEMENT FOR A DRIVE UNIT

[75] Inventor: Hermann Danckert, Wolfsburg, Fed. Rep. of Germany

[73] Assignee: Volkswagenwerk Aktiengesellschaft, Wolfsburg, Fed. Rep. of Germany

[21] Appl. No.: 343,503

[22] Filed: Jan. 28, 1982

Related U.S. Application Data

[63] Continuation of Ser. No. 73,284, Sep. 7, 1979, abandoned.

[30] Foreign Application Priority Data

Oct. 4, 1978 [DE] Fed. Rep. of Germany ....... 2843185

[51] Int. Cl.$^3$ .............................................. B60K 5/00
[52] U.S. Cl. ................................... 180/300; 180/297; 248/585; 248/638
[58] Field of Search ............... 180/312, 299, 297, 293, 180/300; 248/638, 605, 607, 596, 585, 584, 580

[56] References Cited

U.S. PATENT DOCUMENTS

| 3,825,090 | 7/1974 | Runkle et al. | 180/300 |
| 4,240,517 | 12/1980 | Harlow et al. | 180/300 |

FOREIGN PATENT DOCUMENTS

| 1307384 | 9/1962 | France | 180/300 |
| 1357185 | 2/1964 | France | 180/300 |
| 456187 | 8/1935 | United Kingdom | 248/607 |

*Primary Examiner*—Robert J. Spar
*Assistant Examiner*—Donald W. Underwood
*Attorney, Agent, or Firm*—Brumbaugh, Graves, Donohue & Raymond

[57] ABSTRACT

A bearing arrangement for mounting a drive unit on a supporting framework of a vehicle is designed so that vibrations from the drive unit are isolated from the vehicle. The arrangement includes at least one torque bracing device for counteracting the reaction moment created by the output shaft of the drive unit by transmitting these torques to the framework. Supporting bearings intercept inertial forces of the drive unit, but in order to accomplish the vibration insulation the torque bracing device is made flexible with respect to inertial forces so as to prevent their transmission to the framework by said torque bracing device. Thus, these static or quasi-static inertial forces do not overload a spring element with a progressive characteristic that is provided in the arrangement. Inertial forces can be converted into torques by proper location of the support bearings away from the centroidal axis of the drive unit. Further, by mounting elongated elements of the torque bracing devices at points that are free of transverse vibrations, the torque bracing can be rendered free of inertial vibrations.

9 Claims, 5 Drawing Figures

VIBRATION-INSULATING BEARING ARRANGEMENT FOR A DRIVE UNIT

This is a continuation of application Ser. No. 073,284 filed Sept. 7, 1979, now abandoned.

BACKGROUND OF THE INVENTION

The present invention concerns a vibration-insulating bearing arrangement for a drive unit and, more particularly for an engine, e.g., an internal combustion engine, by itself or in combination with a transmission.

It is known that such a bearing arrangement must absorb forces resulting from the mass of the drive unit, i.e., due to the weight of the unit as well as acceleration and deceleration forces, and from torques dues to the reaction moment produced by the output shaft of the drive unit and possibly moments generated by the mass related forces. It is known from German Letters of Disclosure 26 15 503 that it is difficult to design the known type of bearing arrangments for drive units in automobiles in such a manner that the desired vibration suppression, i.e., the prevention of the transmission of noises into the automobile proper, is ensured for the various stresses, both forces and torques. The design of such units is made even more difficult in that the mounting or suspension must respond to two opposite requirements. On the one hand, in order to reduce as much as possible the transmission of vibrations into the supporting framework, and thereby into the vehicle proper, i.e., in order to diminish the transmission of vibrations of the drive unit into the vehicle, the bearings in the bearing arrangement must be yielding. On the other hand, however, for reason of travel and driving dynamics, the relative movements between the drive unit and the vehicle proper ought to be small. This, in turn, necessitates a relatively unyielding design for the individual bearings of the bearing arrangement. A method is known, however, whereby these two opposing aspects are taken into account by the use of bearings with progressive spring characteristics, i.e., bearings which have a relatively hard effect only at larger vibration amplitudes. However, in the final analysis, such bearings are also unsatisfactory in that the static or quasi-static bearing loads vary within a relatively wide range and may push the working point of the bearing into the progressively stiffer spring zone even for small vibrations.

The aforementioned German Letters of Disclosure No. 26 15 503 describes a bearing arrangement that provides individual bearings for the internal forces that occur in the various coordinate directions, so that ideally the design of each individual bearing can be effected optimally in consideration of the inertial forces that occur in the associated coordinate direction. Two webs or bars are provided in this design for torque bracing of the drive unit. When the axis of one of the bars passes through the torque axis containing the center of gravity of the drive unit, the other bar need not absorb any inertial forces, i.e., it can be dimensioned in consideration of its purpose as a torque bracing. However, as in the past, this one bar is subject to double the stress due to the torques and inertial forces which occur. Moreover, it has been found that the vibration paths, which are contingent upon the manner of operation of the engine, when viewed from the vector point of view, may extend within an ellipse, whereby the individual vibration insulation in the direction of the individual bars may be disturbed because the vibration is no longer in the direction of the bars.

SUMMARY OF THE INVENTION

It is the purpose of the present invention to create a vibration insulating bearing arrangement for a drive unit supported on the framework of a vehicle, whereby disturbing fluctuations in the static or quasi-static bearing loads can be avoided and also the torque bracing means can be designed solely in consideration of the generation of counter torques with an optimal characteristic. The attainment of this purpose in accordance with the invention is achieved by making the torque bracing means flexible with respect to inertial forces.

The essential advantage of the invention may be found in the fact that due to the avoidance of disturbing fluctuations of the static or quasi-static bearing loads, the opposite requirements of flexibility in the bearings to minimize vibrations transmitted to the framework and rigidness in the bearings to improve driving dynamics, can be taken into account in the design of the bearings. This is done by making use of very yielding bearings with highly progessive spring characteristics, without thereby creating the danger that the working point of the bearing will be displaced into the progressive zone of its spring characteristic for small amplitude vibrations, due to fluctuations of the static loads.

In one illustrative embodiment of the invention inertial forces and other mass related forces are compensated with an elastic bearing located to one side of the center of gravity so as to convert these forces to torsional moments. These torsional moments, as well as others due to the reaction moment of the output shaft of the drive unit, are compensated in a torque bracing arrangement. The torque bracing device includes two parallel spring bars articulately connected between the drive unit and a rigid transmission plate, and two additional parallel spring bars articulately connected between the transmission plate and the vehicle frame. The bars from the drive unit are attached to the transmission plate at the point along their length which is free of transverse vibrations. The bars from the transmission plate are also connected to the framework at the point that is free of transverse vibrations. Thus only torsional forces are applied to the framework and the translational vibrations are kept from being transmitted to the framework from the drive unit.

In another embodiment the bars from the transmission plate to the framework are replaced with a torsion bar held in place by a web that can be elastically twisted by inertial forces. Also the transmission plate is elastic.

A further embodiment has inertial forces compensated by elastic bearings and torque forces compensated by a torsion bar mounted in torsion-elastic bearings or spring joints.

In a still further embodiment elastic transmission plates are supported on the framework so as to absorb torsion forces by means of torsion bars mounted in elastic webs. Also the support bearings for inertial forces are located outside the centroidal axis of the drive unit so as to convert the inertial forces into torsional moments.

BRIEF DESCRIPTION OF THE DRAWINGS

The invention will be explained below with reference to four examples of embodiments represented in the drawings in which.

The drive unit in these figures, as well as the supporting framework of the vehicle, are only suggested to the extent to which these elements are needed for a better understanding of the invention.

DESCRIPTION OF PREFERRED EMBODIMENTS

Figure 1:
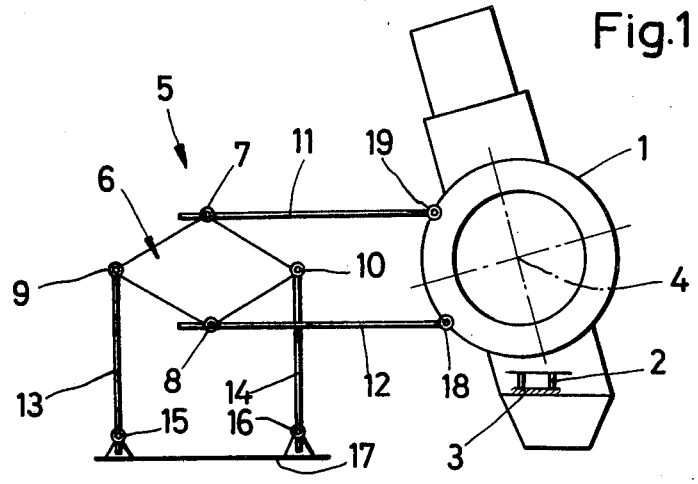
FIG. 1 shows a first example of an embodiment of the invention viewed in the longitudinal direction of the drive unit, which drive unit is shown here, as well as in the subsequent examples of the invention, transversely installed in the vehicle.

In FIG. 1, a drive unit 1, e.g., an internal combustion engine and a transmission, is supported by bearings 2 so as to absorb the inertial forces of the drive unit, including its weight. The bearings 2 which, in a manner known per se, contain elastic means are fixed at point 3 to the supporting framework of the vehicle.

Due in particular to the reaction moment of the output shaft of the drive unit 1, a torsional moment around the axis of rotation 4 is created, which moment is intercepted by a torque bracing arrangement 5. The torque bracing arrangement contains as a center component a transmission element 6, which in this example is constituted by a rigid trapezoidal plate. The transmission element 6 is provided with a total of four force introduction points 7, 8, 9 and 10 of which the first two serve for articulately receiving parallel bars 11 and 12 which are also articulated to the drive unit 1 in the zone of their right ends as shown in FIG. 1. Thus, because of the articulate connection, the two parallel elongated bars 11 and 12 transmit only forces in the direction of their longitudinal axes.

The two other force introduction points, 9 and 10 serve as points of application for hinged supports constituted by elongated parallel bars 13 and 14. The bottom ends of the bars 13 and 14 are articulated on a supporting framework 17 of the vehicle at points 15 and 16. Thus, the pairs of bars 11, 12, 13 and 14 ensure that only torsional moments around the axis of rotation 4 are opposed, i.e., the torsional moments are introduced into the supporting framework 17, but the inertial forces that occur in any direction whatever, are not absorbed by the torque bracing arrangement 5.

In order to attain the desired spring characteristic or elastic characteristic of the torque bracing arrangement 5, the bars may be designed, at least in part, as spring legs, or the force introduction points may be constructed as elastic pivot bearings.

The bars 11 and 12 are articulated at points 18 and 19 on the drive unit 1. By means of these connections, vibrations are introduced into the bars 11 and 12 when the drive unit 1 executes movements with perpendicular (or vertical) components. In order also to free the torque bracing device from these vibrations, the points of connection 7 and 8 and, respectively 15 and 16, are not placed directly at the ends of the respective bars 11 to 14. Rather, they are placed at a distance therefrom, at such points of the bars as are free from transverse vibrations. It is known that a bar subjected to cross vibrations at one of its ends, and not supported at any other point, possesses a point in which it is free from transverse vibrations. As a matter of principle, it is also possible to shorten the projecting ends of the bars by application of additional masses.

FIG. 1 shows clearly that the bearings 2 for receiving the inertial forces are placed outside a line through the center of gravity of the drive unit 1 so that they perform a partial "conversion" of the forces of inertia into torsional moments around the axis of rotation 4, which conversion is a function of the distance concerned. These moments are also absorbed by the torque bracing arrangement 5.

Figure 2:
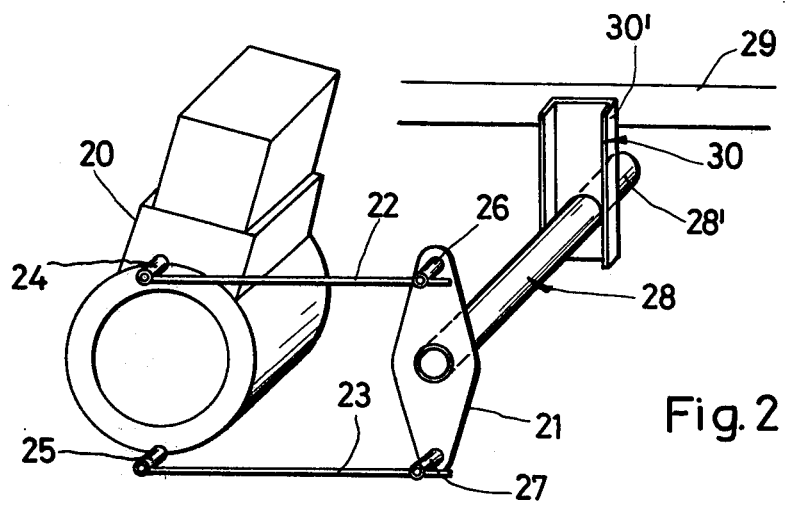
FIG. 2 shows a second example of an embodiment in perspective.

In the example of an embodiment as per FIG. 2, the transmission of the torques from a drive unit 20 into a transmission element 21 is again obtained by means of two parallel bars, 22 and 23, which are articulated on the points 26 and 27 on the transmission element 21. The support at 26 and 27 is again obtained at transverse force-free points of the bars 22 and 23. However, in this case the transmission element 21 is not held on a supporting framework 29 by means of further elongated bars, but rather by means of a torsion bar 28 which is possibly designed as a torsion tube. The mounting of bar 28 on the framework 29 is obtained by means of a metal plate web 30 that is elastically twisted in response to inertial forces that appear, but which is in a torque-resistant connection with the torsion bar 28. The transmission element 21 also may be designed as an elastic metal plate. The metal web 30 may be provided with a flanged edge 30' as protection against buckling.

As evidenced by the projecting end 28' of the torsion bar 28, the point of connection between the torsion bar and the metal web 30 is at the transverse vibration-free point of the torsion bar 28, such as has already been described in principle for the corresponding points of connection of bars 11 to 14 in FIG. 1.

Figure 3:
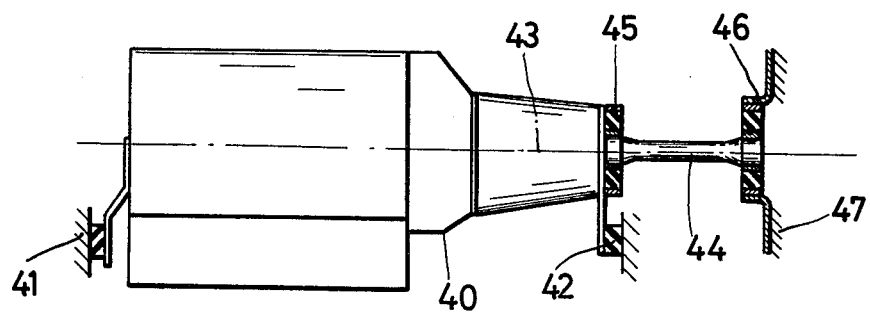
FIG. 3 illustrates a third example of an embodiment of the invention in plan view.

The example of an embodiment of the invention in FIG. 3 has a simpler construction than the previous embodiments. In this Figure there is a drive unit 40 which is braced against inertial forces by means of bearings 41 and 42. Along an extension of the axis of rotation 43 of the drive unit 40 there is arranged a torsion bar 44, possibly in the shape of a tube, which acts as a torque bracing device. The ends of the torsion bar 44 are connected by way of torsion-elastic rubber bearings 45 and 46, which are in the form of torque-transmitting spring joints, with the drive unit 40 and a supporting framework 47. In the tangential directions in planes perpendicular to their longitudinal axes, these bearings have a spring characteristic which is optimized with respect to torque bracing, whereas they permit swivelling of the torsion bar in directions perpendicular to its longitudinal axis, so that no vibrations resulting from inertial forces can be transmitted into the vehicle proper by way of the torque bracing elements 44, 45 and 46.

Figure 4:
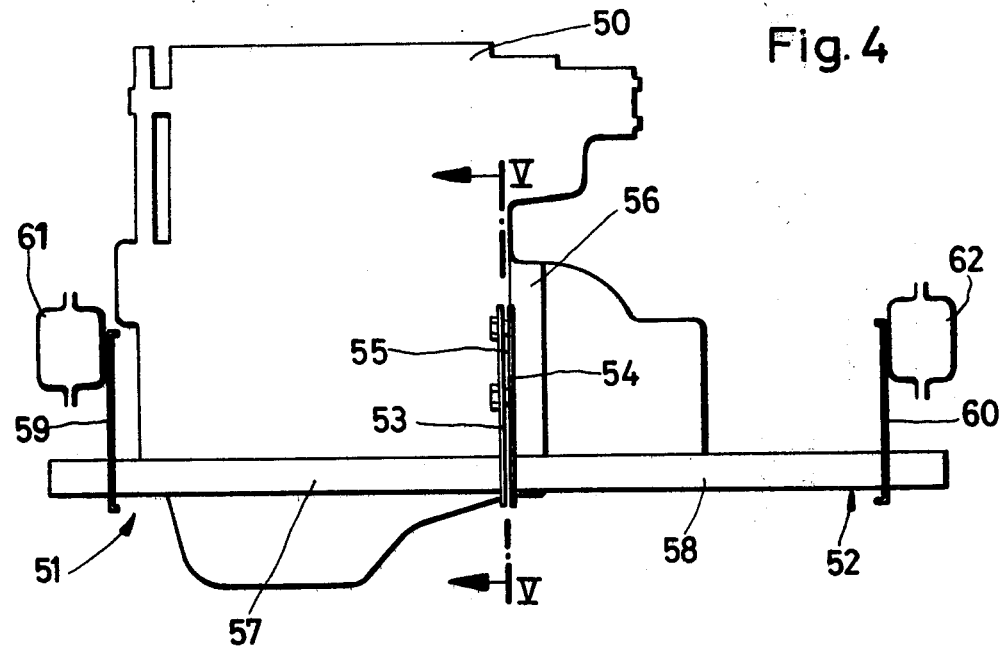
FIGS. 4 and 5 illustrate a fourth example of the invention in elevation, as well as in section as per line V—V in FIG. 4.
Figure 5:
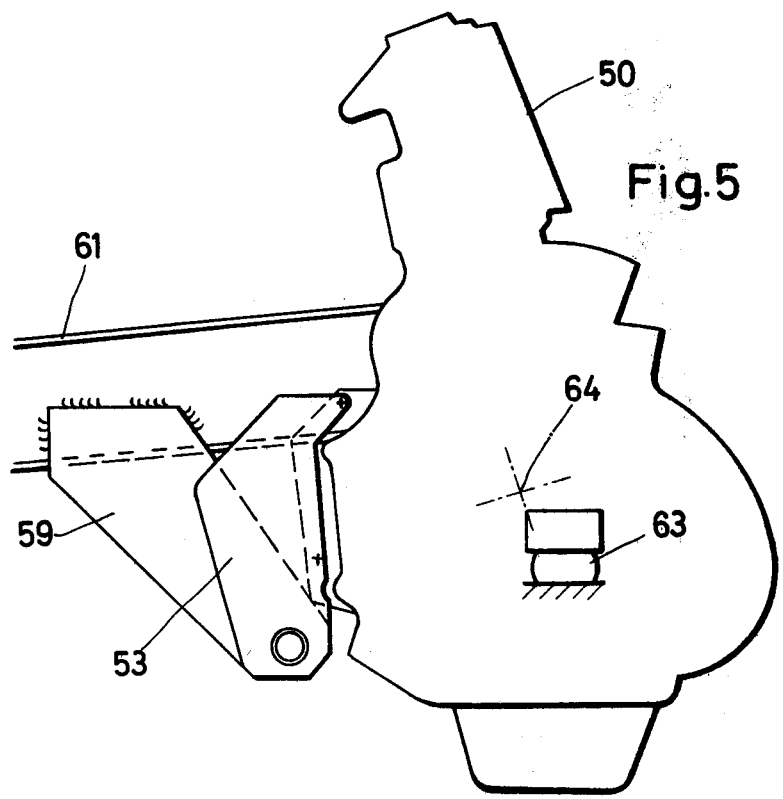

The example of an embodiment of the invention in FIGS. 4 and 5, like that in FIG. 2, uses transmission elements constituted by elastic metal plates in combination with torsion bars. In this example two torque bracing arrangements 51 and 52 act on a drive unit 50. Both of them contain a transmission element, 53 and 54 respectively, in the form of an elastic metal plate. Between the two of them there is located a spacer ring 55 so that they can be screwed to a transmission case flange 56 without their movements being mutually obstructed. Moreover, each of the torque bracing arrangments contain a torsion bar, 57 and 58 respectively. By means of elastic metal webs 59 and 60 respectively, which are applied to the transverse vibration-free point of the associated torsion bar, these torsion bars are fixed on longitudinal members 61 and 62 respectively, of the supporting framework in a torque-transmitting manner. With this arrangement, however, the forces of inertia are not transmitted.

As suggested in the diagram in FIG. 5, supporting bearings 63 for the drive unit 50 are placed outside the centroidal axis 64 thereof, so that inertial forces produce torsional moments which are likewise introduced into the supporting framework 61, 62 over the two torque bracing arrangements 51 and 52.

Common to all of the examples of the invention is at least one torque bracing means designed in such a manner that it transmits only torques and not forces, and accordingly, cannot forward any translation-type vibrations into the supporting framework and thereby into the vehicle proper. Accordingly, the forces exerted on the bearings remain practically constant within the normal acceleration range, independent of the driving moment generated by the drive unit. Therefore, the bearings can be designed with a progressive spring characteristic, whereby within the range of normal acceleration forces, the working point is placed in the soft zone of the characteristic. In case of greater accelerations, the greatly progressive region of the bearing spring characteristic is utilized. Accordingly, there results a very high sound damping in the entire bearing arrangement, except in cases of large accelerations.

I claim:

1. A vibration-insulating bearing arrangement for mounting a drive unit, having a drive axis, on a supporting framework of a vehicle comprising:
   a bearing means arranged between said drive unit and said framework for intercepting inertial forces of said drive unit; and
   a torque brace including:
   a torque transmitting element;
   a first torque transmission means connecting said drive unit and said torque transmitting element for transmitting a rotational force to said torque transmitting element in response to a torsional movement of said drive unit about said axis, and for imparting a translational force to said torque transmitting element in response to inertial force caused by movement of said drive unit;
   a second torque transmission means connecting said torque transmitting element and said framework for opposing said rotational force imparted to said torque transmitting element from said first transmission means, and for permitting the translational movement of said torque transmitting element in response to said inertial force;
   said torque transmitting element transmitting said torsional forces to said framework, and yielding to movement of said drive unit so as substantially to prevent the transmission of said inertial force into said framework, characterized in that the transmission element is in a support means that is rigid between at least four force-introduction points, a first pair of said force-introduction points being articulated torque-transmitting connection with the drive unit by means of a first pair of elongated bar elements and, a second pair of said force-introduction points being articulately connected in a swiveling manner to the supporting framework, the second pair of said force-introduction points being movable essentially perpendicular to a connecting line between the first pair of force-introduction points.

2. A bearing arrangement as claimed in claim 1, characterized in that the force-introduction points are arranged in an approximately trapezoidal configuration.

3. A bearing arrangement as claimed in claims 1 or 2, characterized in that the second pair of force introduction points are joined flexibly with a second pair of substantially parallel elongated bar elements that, in turn, are articulated in a swivelling manner, in the plane of the transmission element, on the supporting framework.

4. A bearing arrangement as claimed in claims 1 or 2, characterized in that, at the force-introduction points, there are provided elastic articulation connections in order to attain a predetermined torsional elasticity of the torque bracing means.

5. A bearing arrangement as claimed in claim 3, characterized in that, at the force-introduction points, there are provided elastic articulation connections in order to attain a predetermined torsional elasticity of the torque bracing means.

6. A bearing arrangement as claimed in claims 1 or 2, characterized in that the elongated bar elements are in the form of spring legs in order to attain a predetermined torsional elasticity of the torque bracing means.

7. A bearing arrangement as claimed in claim 3, characterized in that the elongated bar elements are in the form of spring legs in order to attain a predetermined torsional elasticity of the torque bracing means.

8. A bearing arrangement as claimed in claims 1 or 2, characterized in that the elongated elements of the torque bracing means each have one end that receives transverse vibrations passing from the drive unit and, in the vicinity of their other ends, they are connected with successive elements of the torque bracing means at points of the elongated elements that are free from transverse vibrations.

9. A bearing arrangement as claimed in claim 8, characterized in that the points of the elongated elements that are free from transverse vibrations are varied by locating additional masses in the vicinity of their other ends.

* * * * *

UNITED STATES PATENT AND TRADEMARK OFFICE
CERTIFICATE OF CORRECTION

PATENT NO. : 4,440,257
DATED     : April 3, 1984
INVENTOR(S) : Hermann Danckert

It is certified that error appears in the above-identified patent and that said Letters Patent is hereby corrected as shown below:

Col. 4, line 17, after "the" (first occurrence) insert -- drive unit 20 at points 24 and 25, and are articulated at --.

Signed and Sealed this

Fourth Day of September 1984

[SEAL]

Attest:

GERALD J. MOSSINGHOFF

Attesting Officer    Commissioner of Patents and Trademarks